US006185594B1

United States Patent
Hilton et al.

(10) Patent No.: US 6,185,594 B1
(45) Date of Patent: Feb. 6, 2001

(54) VERSATILE SIGNAL GENERATOR

(75) Inventors: Howard E Hilton, Snohomish; John H. Guilford, Everett, both of WA (US)

(73) Assignee: Agilent Technologies Inc., Palo Alto, CA (US)

( * ) Notice: Under 35 U.S.C. 154(b), the term of this patent shall be extended for 0 days.

(21) Appl. No.: 09/136,877

(22) Filed: Aug. 19, 1998

Related U.S. Application Data

(63) Continuation-in-part of application No. 09/019,146, filed on Feb. 5, 1998, now abandoned.

(51) Int. Cl.[7] .................................................. G06F 1/02
(52) U.S. Cl. .............................................................. 708/270
(58) Field of Search ................................ 708/270–277; 714/738; 332/103

(56) References Cited

U.S. PATENT DOCUMENTS

| 4,742,518 | 5/1988 | Shedd | 371/22 |
| 5,235,534 | 8/1993 | Potter | 364/724.01 |
| 5,420,887 | 5/1995 | Rhodes et al. | 375/295 |
| 5,859,787 | * 1/1999 | Wang et al. | 708/270 |

FOREIGN PATENT DOCUMENTS 0377519  7/1990  (EP) .

OTHER PUBLICATIONS

Poklemba JJ, et al. "A Digitally Implemented Modem: Theory And Emulation Results"; Comsat Technical Review, vol. 22, No. 1, Jan.1992 , pp. 149–194, XP000327960; p. 151, line 14—p. 158, line 15; figures 2,3.

* cited by examiner

Primary Examiner—David H. Malzahn

(57) ABSTRACT

A versatile signal generator for generating digitally modulated test signals computed in real-time is provided. Each of the blocks of the versatile signal generator, including the MUX, coder, map, filter, re-sampler, and modulator, are implemented in a sufficiently flexible manner so as to allow ready configuration to produce any of a variety of digitally modulated signals as well as high quality analog modulated signals. Each of the blocks may be implemented using ASICs and RAM that allow to obtain high symbol rates while being capable of being reconfigured for different test signals as needed. The versatile signal generator has a real time input for receiving input data to modulate the test signal in real time.

17 Claims, 8 Drawing Sheets

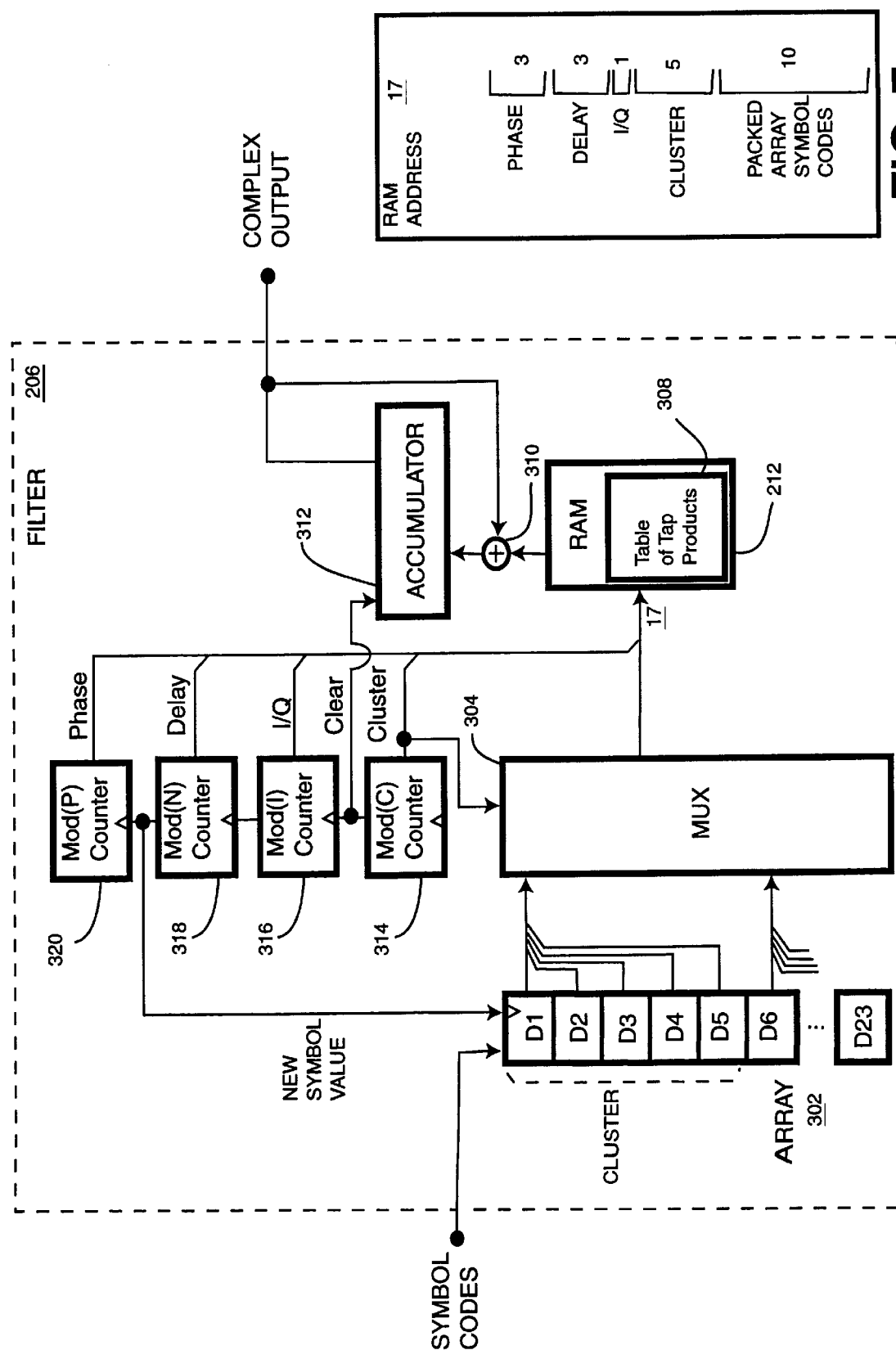

VERSATILE SIGNAL GENERATOR

This is a Continuation-In-Part Application of Ser. No. 09/019,146; filed on Feb. 5, 1998, now abandoned.

BACKGROUND OF THE INVENTION

This invention relates generally to signal generators and in particular to a signal generator having a flexible architecture for generating test signals.

Wireless communications, including digital cellular telephones and personal communications service (PCS) telephones, are rapidly becoming a major sector of the communications industry. Emerging wireless communications technologies are a diving force behind the rapidly expanding number of complex signals such as digitally modulated signals that must now be accommodated by the signal generator, both in the design and manufacturing environments. The wireless system designer who must choose a particular digital modulation is faced with a number of challenges. The wireless system must allow for signal strengths that vary over time and location, with multipath, fading and interference. Wireless handsets are increasingly smaller in size and with limited battery capacity. At the same time, user demands continue to increase for higher data rates, better voice quality, fewer dropped calls, and longer talk times. Designing, manufacturing, and maintaining wireless devices thus requires appropriate test equipment such as signal generators which are capable of generating test signals for precisely simulating real world conditions as well as known signals that confonn to industry standards. A discussion of various digitally modulated signal types that exist may be found in "Digital Communication, Second Edition", Lee, Edward, A. and Messerschmitt, David G., Kluwer Academic Publishers, Massachussetts, 1994.

Signal generators must be versatile and powerful enough to handle both existing and newly created modulation types. During the development of a new wireless system, designers may be faced with the problem of not having a receiver to verify the operation of the signal generator and no signal generator capable of verifying the operation of the receiver. A versatile signal source will help in avoiding this dilemma by providing a known test signal by which the performance of the new receiver can be determined without developing specialized prototypes.

Signal generators may be used to test wireless communications devices in a number of ways. For example, it may be useful to examine the device's response to non-ideal signals by providing a test signal that deviates in a known manner from an ideal signal. As a further example, wireless communications devices must operate in crowded spectral environments alongside other communications systems. A number of signal generators may be combined in parallel to simulate in a controlled manner a complete spectral environment by generating a multitude of interfering signals having a variety of signal strengths, frequencies, and modulation types.

In the manufacturing environment, the same test station must often handle different types of wireless devices having a variety of modulation types. A versatile signal source reduces the need for additional equipment and simplifies test system requirements. Function generators are well known for their versatility in providing test signals which are amplitude, frequency, or phase modulated over frequency ranges typically spanning d.c. (direct current) to approximately 20 MegaHertz (MHz). Function generators are well suited for testing analog devices and simulating traditional analog modulation types and have the advantage of being able to accept an input signal and generate a test signal with real time modulation responsive to the input signal. However, the ability of the function generator to generate more complex digital modulation types is very limited because of its primarily analog architecture.

Arbitrary waveform generators (AWGs) are a more recent design, employing digital waveform memories and digital to analog converters (DACs) to generate a test signals of greater complexity. Given an adequate memory size and maximum sample rate, AWGs can be very versatile in simulating a variety of test signals. However, AWGs generally have no ability to accept digital input signals in order to generate real-time signals that communicate actual information. The test signal being generated by the AWG must be calculated and stored ahead of time as pre-computed samples in the digital waveform memory. Because pre-computed samples are stored in terms of voltage values to be played back at a selected sample rate, the computations necessary to generate a desired test signal can be significant.

The ability of the AWG to generate complex signals is further limited by the size of the digital waveform memory and the maximum sample rate, often requiring trade-offs between frequency content and waveform complexity. Because the digital waveform memory is typically used to generate the test signal by continuously repeating the contents of the digital waveform memory, care must be taken to avoid a discontinuity between pre-computed sample values stored at the beginning and the end of the digital waveform memory. This potential discontinuity further limits the ability of the AWG to generate the desired test signals.

It is generally understood that traditional digital signal processing (DSP) chips, which are essentially microprocessors optimized for signal processing applications, are capable of generating test signals when properly programmed and coupled to a suitable DAC and supporting hardware devices. The DSP chip can accept a real-time input signal, typically in the form of a digital data stream, to produce a real-time digitally modulated signal, with the signal processing calculations handled real-time by the DSP chip. Because of the relative high complexity required to calculate each output sample of the digitally modulated signal in real time, the signal bandwidth that may be obtained is limited by the throughput of the DSP chip and surrounding hardware. Furthermore, reconfiguring a signal generator that is implemented using a DSP chip to work with any of a variety of digital modulation types is difficult and time consuming.

Therefore, it would be desirable to provide a versatile signal generator for generating a variety of test signals including digitally modulated signals with real-time modulation. It would be further desirable that the versatile signal generator be implemented using only dedicated hardware integrated circuits and memory which can be readily configured for different test signals.

SUMMARY OF THE INVENTION

In accordance with the present invention, a flexible signal generator for generating complex signals computed in real-time is provided. A data multiplexer (MUX) selects the source of input data for various fields within the transmitted data sequence. A coder coupled to the MUX produces a sequence of symbol codes according to a symbol table which are then provided to a map function which converts each symbol code to a sequence of signal samples, including real samples, complex samples, and I/Q (in-phase/ quadrature) samples. The signal samples are provided to a filter that provides a selected frequency response to obtain filtered signal samples.

The filtered signal samples are provided to a re-sampler that interpolates the signal samples to obtain a higher sample rate that matches the cutoff frequency of analog reconstruction filters at the output stage. A modulator receives the output of the re-sampler and shifts its frequency using a complex local oscillator to obtain a complex sample sequence. The output of the modulator is provided to digital to analog converters which convert the complex sample sequence to analog outputs which are filtered by the analog reconstruction filters which are implemented as low pass filters.

Each of the blocks of the signal source, including the MUX, coder, map, filter, re-sampler, and modulator, are implemented in a sufficiently flexible manner so as to allow ready configuration to produce any of a variety of digitally modulated signals as well as high quality analog modulated signals. Each of the blocks may be implemented in hardware or software.

In the preferred embodiment, the blocks are implemented using application specific integrated circuits (ASICs) and random access memory (RAM) to obtain high symbol rates and output signals with the desired bandwidth. At the same time, the blocks are capable of being reconfigured for different test signals as needed simply by changing the contents of the RAM. No microprocessor or DSP hardware is used in order to simplify the device requirements and save on circuit board space.

A commercial embodiment of the present invention provides for the versatile signal source as a circuit board module that may be mounted alongside other versatile signal sources on a carrier board to produce a multiple channel signal source in a compact physical package. Each of the versatile signal sources may be synchronized with each other to obtain further versatility, such as simulating multipath signals which have selected amplitude and phase relationships to each other. The versatile signal source according to the present invention is capable of accepting real-time data at the MUX and producing a complex signal which is modulated according to the real-time data.

Each of the blocks of the signal source, including the MUX, coder, map, filter, re-sampler, and modulator, may be controlled according to a set of parameters known in the art for signal processing, including modulation type, sample rate, and number of symbol bits, with no need to provide pre-computed sample values or to program the signal parameters in low level languages. The set of parameters may be programmed using software graphical user interfaces (GUIs) commonly available in the industry as well as a set of software library functions for use in programming environments.

One feature of the present invention is to provide a versatile signal source.

Another feature of the present invention is to provide a signal source having a versatile architecture that may be readily adapted for different types of test signals.

A further feature of the present invention is to provide a signal source having a versatile architecture that may be adapted for different types of test signals by setting signal parameters.

An additional feature of the present invention is to provide a signal source having a real time input for receiving input data to modulate an output signal in real time.

Other features, attainments, and advantages will become apparent to those skilled in the art upon a reading of the following description when taken in conjunction with the accompanying drawings.

BRIEF DESCRIPTION OF THE DRAWINGS

FIG. 6 is a block diagram of a second embodiment of the map and filter which form part of the complex signal generator of FIG. 3;

FIG. 7 is a detailed view of the RAM address shown in FIG. 6;

DETAILED DESCRIPTION OF THE INVENTION

Figure 1:
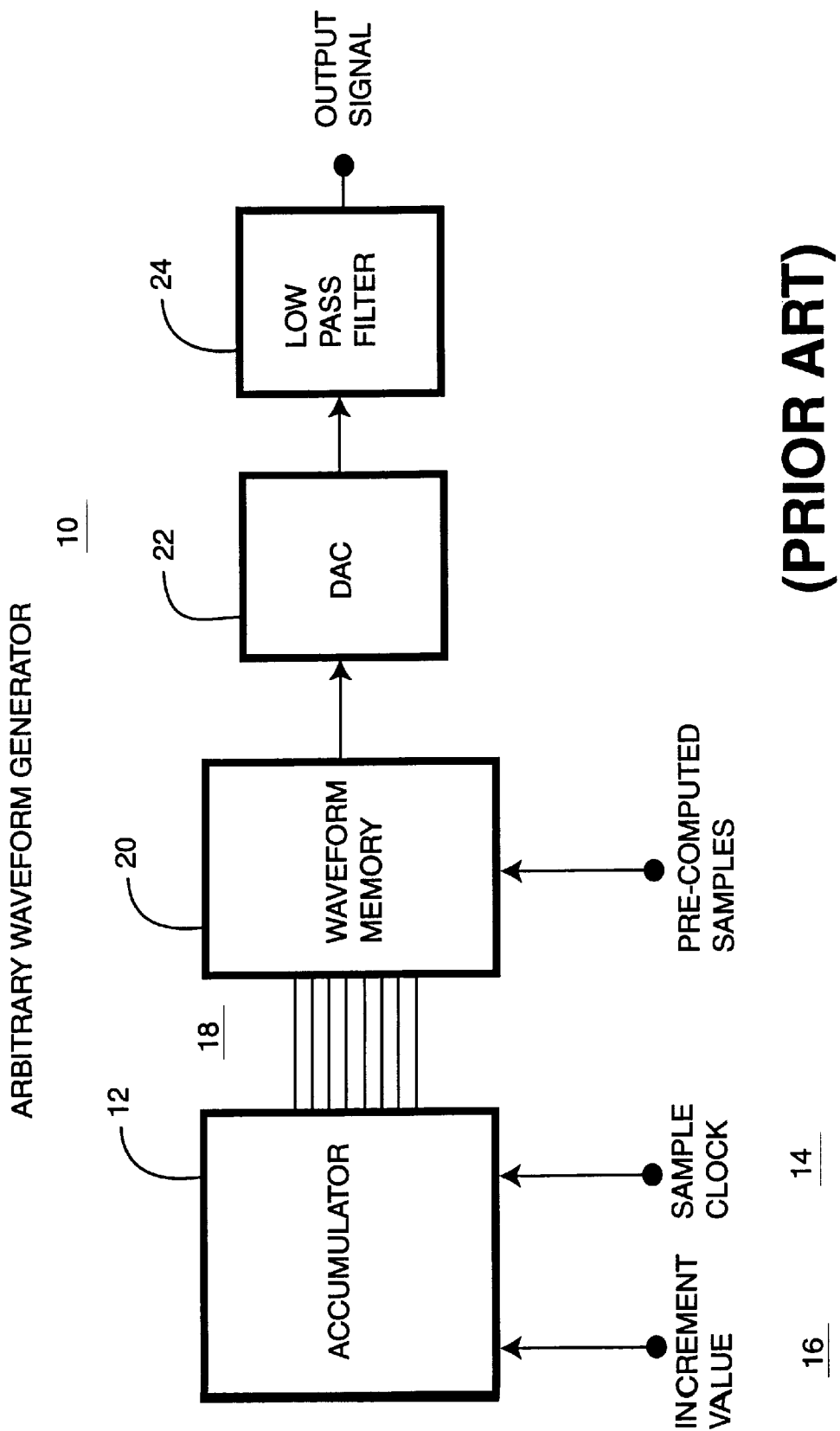
FIG. 1 is a block diagram of an arbitrary waveform generator according to the prior art.

In FIG. 1, there is shown a block diagram of an arbitrary waveform generator (AWG) 10 according to the prior art. An accumulator 12 operates as a binary counter by incrementing through a series of addresses at a rate determined by a sample clock 14, with the address incremented by an increment value 16. The address from the accumulator 12 is provided via a set of address lines 18 to a waveform memory 20. The waveform memory 20 contains a set of pre-computed samples that represent a complex signal. Pre-computed samples are provided to a DAC 22 according the address from the accumulator 12. The DAC 22 produces voltages according the values of the pre-computed samples at a sample rate which are then provided to a low pass filter 24. The low pass filter 24 has a frequency characteristic matched to the sample clock 14 such that sampling frequency components are removed from the output signal.

The output signal does not contain real time information because the set of pre-computed samples must be loaded in before the AWG 10 begins to produce an output signal. Tradeoffs must be made between signal complexity and bandwidth because the length of the waveform memory 20 is limited. The output signal is defined strictly in terms of sample values and sample rates that are set according to the pre-computed samples and the sample clock rate. However, complex signals are more readily defined in terms of data streams and symbols rather than in terms of sample times and voltage levels, thus requiring tedious calculations to be performed on the pre-computed samples in order to obtain the test signal.

Figure 2:
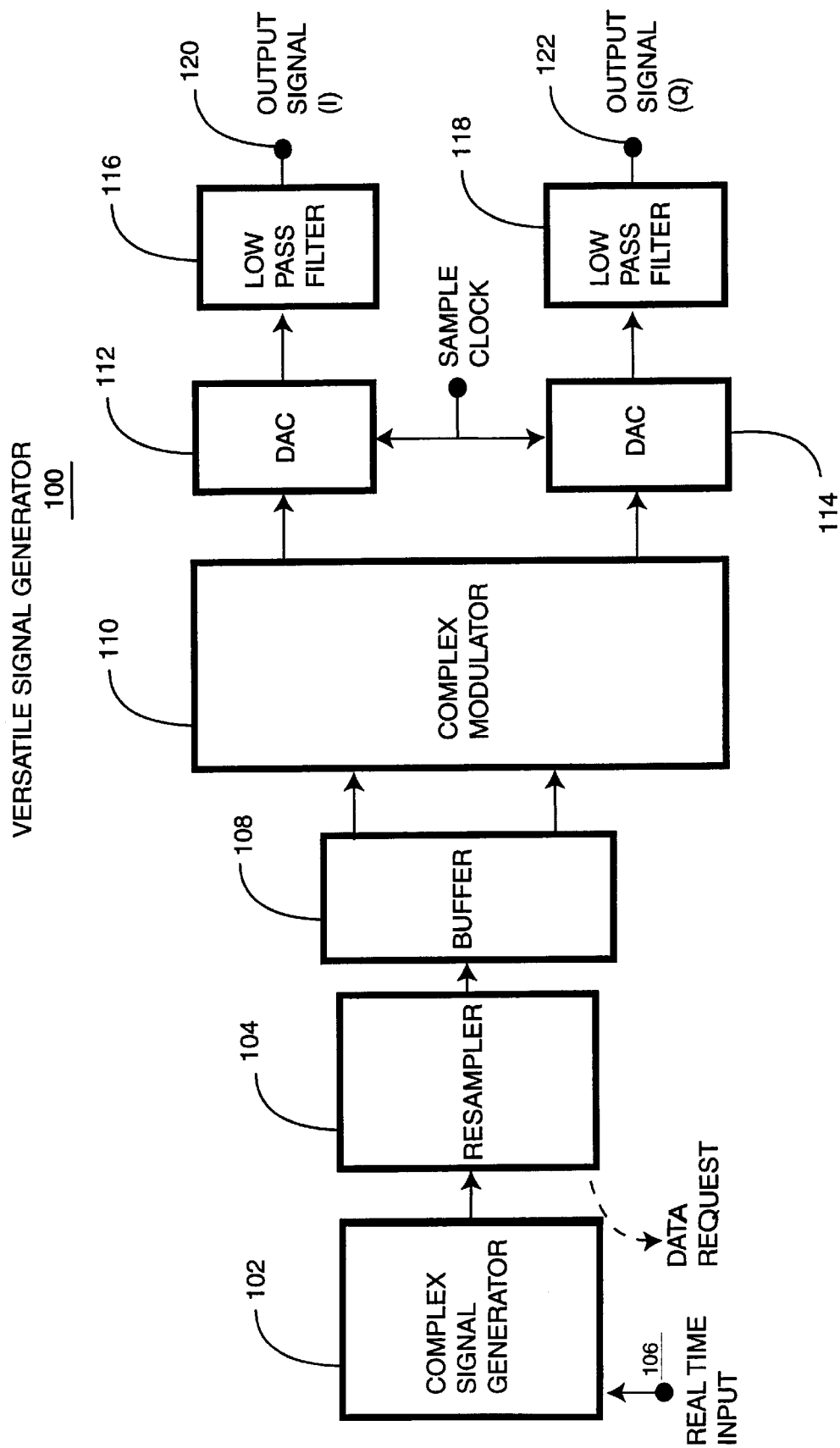
FIG. 2 is a block diagram of a versatile signal generator according to the present invention.

In FIG. 2, there is shown a block diagram of a versatile signal generator 100 according to the present invention. A complex signal generator 102 produces a complex output that is a sequence of digitized samples that represent the desired test signal. The sequence of digitized samples may consist of interleaved real and imaginary outputs.

Alternatively, the complex output can be selected as a real output having no interleaved imaginary output or with an imaginary output with the digitized samples set to zero values.

A resampler 104 accepts the complex output from the complex signal generator 102 at an input sample rate. The resampler 104 converts the complex output to an output sample rate that is typically fixed according to a desired sample rate and signal bandwidth of the output signal. The ratio between the input sample rate and the output sample rate is a programmable floating-point parameter. In the preferred embodiment, the output sample rate is fixed at 15 MegaSamples per second (MS/s) to match a fixed 15 MS/s sample rate of the output signal. The input sample rate is typically less than 15 MS/s. Re-sampling techniques to effectively change the sample rate up or down while preserving frequency information are discussed U.S. Pat. No. 5,235,534, "METHOD AND APPARATUS FOR INTERPOLATING BETWEEN DATA SAMPLES", issued Aug. 10, 1993, to Ronald W. Potter and assigned to Hewlett-Packard Company.

The complex signal generator 102 has a real time input 106 for receiving digital data that can be used for modulating the complex signal. In this way, the information from the digital data can used to modulate the output signal produced by the versatile signal generator 100 in real time.

The resampler 104 requests complex output from the complex signal generator 102 whenever needed. The complex signal generator 102, in turn, requests input data from the real time input 106 whenever needed. In this way, the versatile signal generator 100 implements a "data pull" flow control mechanism which simplifies signal timing requirements for the input data arriving at the real time input 106.

A buffer 108 accepts the resampled output from the resampler 104 and splits the interleaved real and imaginary parts into separate real and imaginary data streams. The buffer 108 is implemented as a separate ASIC in the preferred embodiment to achieve higher throughput speeds. The real and imaginary data streams produced by the buffer 108 are then provided to a complex modulator 110. The function of the buffer 108 may be readily incorporated into the complex modulator 110 if performance considerations allow so that the complex modulator 110 can accept the resampled output directly from the resampler 104. The buffer 108 may be omitted from the versatile signal generator 100 if only real output signals are to be generated, thus reducing component count but at an attendant loss in versatility.

The complex modulator 110 accepts the imaginary and real data streams from the buffer 108 at I (real) and Q (imaginary) inputs, treating the I and Q inputs as a complex number which is multiplied by the output of a complex local oscillator present in the complex modulator 110 (not shown) to up-convert the complex signal to obtain a resampled signal at a desired carrier frequency. The resampled signal may be obtained directly with no up-conversion by selecting a zero Hz carrier frequency for the complex local oscillator. Alternatively, the complex modulator 110 can operate as a frequency modulator to produce an output signal with the magnitude determined by the I input and the frequency deviation determined by the Q input.

The complex modulator 110 produces the resampled signal as streams of real samples and imaginary samples that are supplied to digital to analog converters (DACs) 112 and 114 respectively for conversion to real and imaginary output signals. Low pass filters 116 and 118 filter the real and imaginary output signals provided by the DACs 112 and 114 to obtain frequency roll characteristics matched to the chosen sample rate of 15 MS/s. In the preferred embodiment, each of the low pass filters 116 and 118 have a frequency transfer function chosen to provide a flat amplitude versus frequency response out to 6.3 MHz while eliminating the higher frequency components which are artifacts of the sampling process. The low pass filters 116 and 118 provide the real and imaginary output signals with the desired frequency characteristics at the output signal terminals 120 and 122 respectively. If only a real output signal is desired, the complex modulator 110 may be readily configured to produce only real samples.

Figure 3:
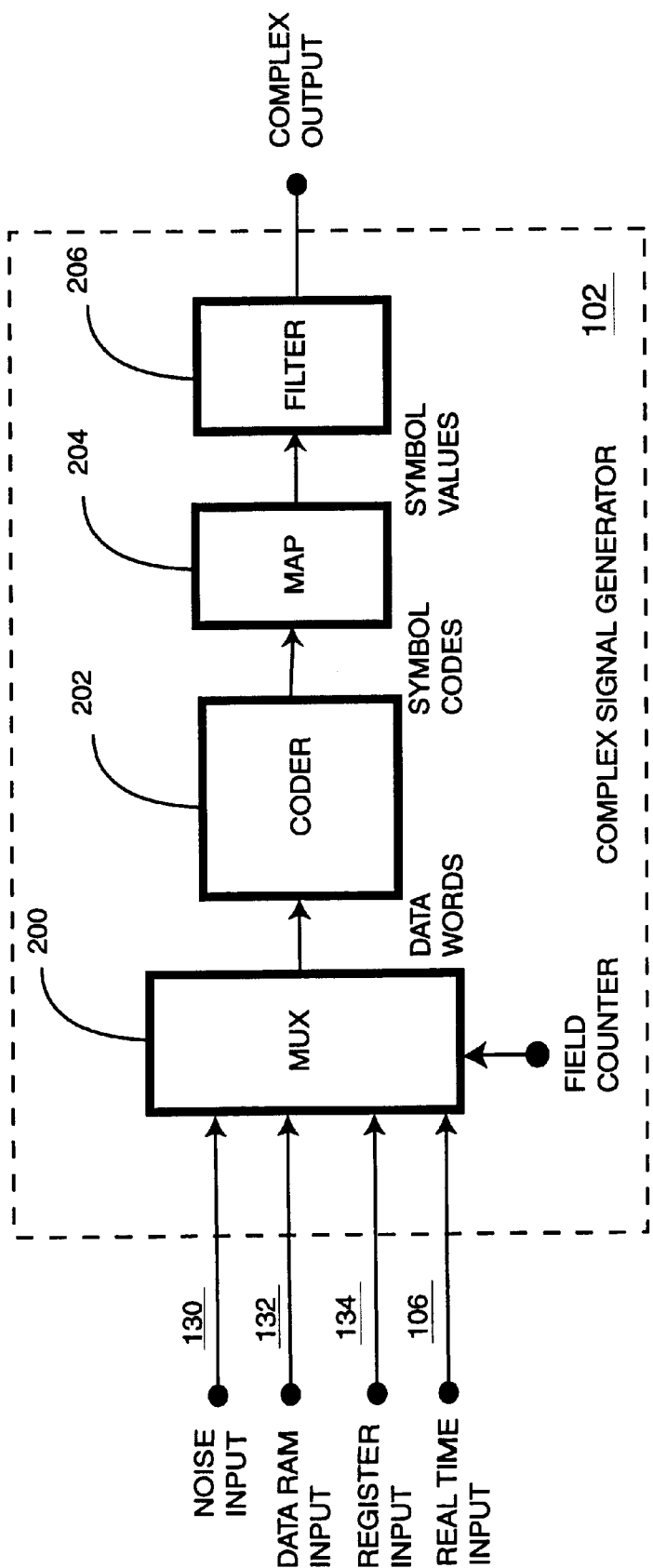
FIG. 3 is a block diagram of a complex signal generator that forms part of the versatile signal generator of FIG. 2.

In FIG. 3, there is shown a block diagram of the complex signal generator 102 (shown in FIG. 2) to illustrate its operation in greater detail. A multiplexer (MUX) 200 selects among various inputs which are connected to various sources of input data, including the real time input 106, a noise input 130, a data RAM input 132, and a register input 134 to modulate the complex output. The noise input 130 may be coupled to a random data generator to receive pseudo-random data in order to simulate random data traffic or to obtain noise with the desired characteristics for test and evaluation purposes. The data RAM input 132 may be connected to on-board RAM which contains a previously stored data sequence that may be accessed for test and evaluation purposes, to set up fixed data patterns for synchronization, and to simulate predetermined types of data traffic. The register input 134 provides a small amount of data for use in selected fields, typically those requiring a zero value data word.

Most digital communications protocols define fields within a transmission sequence. Fields are blocks of time allocated for specific types of information that make up the complex signal. One field might contain a fixed data pattern used for synchronization. Another field may contain a certain number of traffic data words. Still other fields may be guard fields with a fixed data pattern at the beginning and the end of a transmission. In time division multiple access (TDMA) cellular telephone systems for example, the gap between data bursts can be considered as another field consisting of special data words which produce a null signal output. It is desirable that the versatile signal generator 100 have the ability to provide sufficient field generation flexibility through the use of the MUX 200, the noise input 130, the data RAM input 132, the register input 134, and the real time input 106. The timing and sequence of the fields may be controlled at a field counter input on the MUX 200 according to which may be set as a parameter by the user or programmed under software control. Additional MUXs and inputs may be added as needed to support additional fields.

The MUX 200 provides data words to a coder 202 which produces symbol codes from the data words. The symbol codes that are presently produced may have a defined dependency based on past symbol codes and data words that is useful for implementing error coding and differential coding functions. The output symbol codes provided by the coder 202 may have a different number of bits than the input data codes or multiple symbol codes may be generated for each input data code. The coder 202 is programmed using a coder table that is specified by the user and stored in RAM in the coder 202 to provide symbol codes to a map 204. The operation of the coder 202 is explained in more detail below.

The map 204 provides a way to map symbol codes from the coder 202 into symbol values. In the preferred embodiment, the symbol values have an amplitude resolution of 16 bits to match the available resolution of the DACs 112 and 114. The mapping of symbol codes to symbol values may be accomplished by referencing a user specified lookup table that is stored in memory. A user specified phase rotation may also be specified from one symbol to the next. The symbol values produced by the map 204 are then provided to a filter 206.

The filter 206 filters the sequence of symbol values provided by the map 204 using a finite impulse response (FIR) filter to produce a complex output having a desired frequency response. The filter 206 must be able to handle real signals, complex signals, or interleaved I/Q (real and imaginary) signals. For complex signals, the filter coefficients of the FIR filter may be complex values to allow for creating asymmetric frequency responses that are useful in simulating certain signal transmission impairments. For offset modulation, it is necessary to create filters with differing amounts of delay in the real (in-phase "I") and imaginary (quadrature "Q") outputs. The filter 206 allows the sequence of symbol values to be up-sampled, meaning the number of output samples for each input sample is increased, typically by inserting 0's in the input data. The operation of the filter 206 is explained in more detail below.

Figure 4:
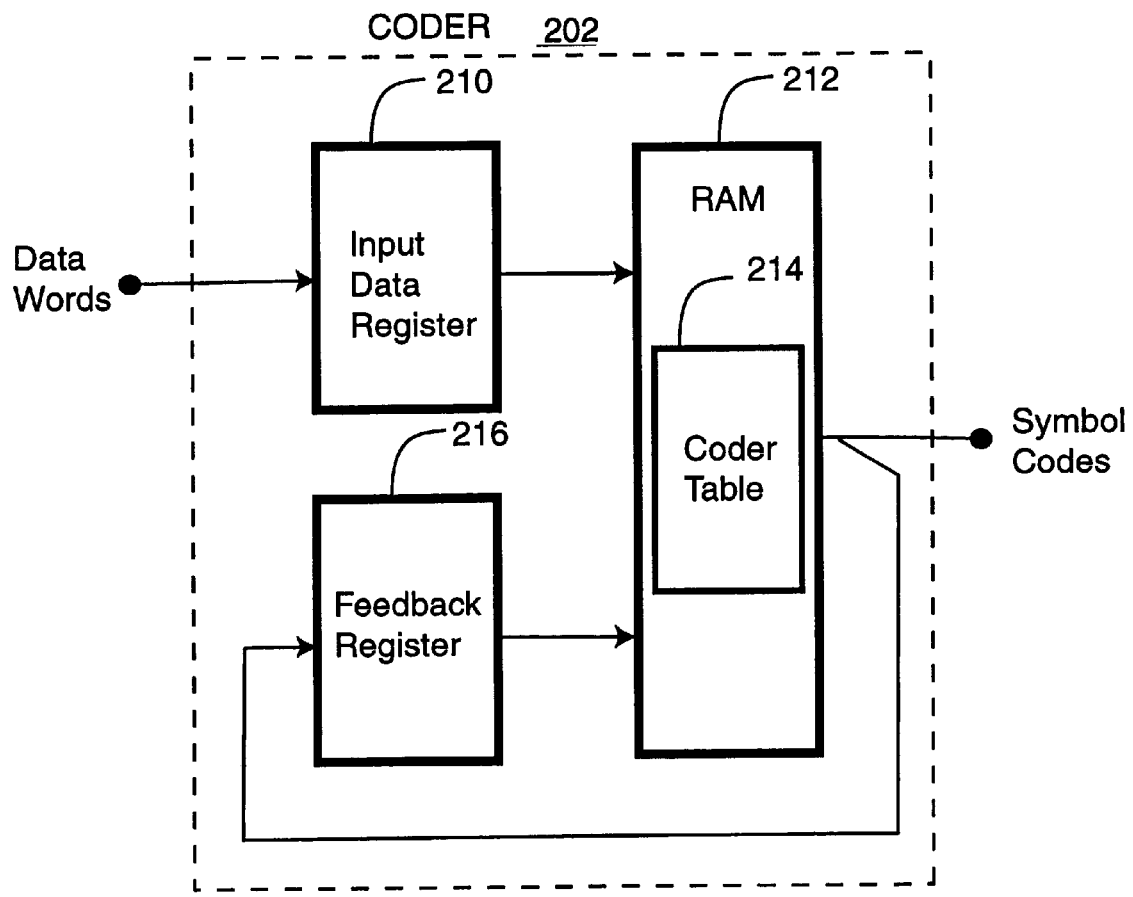
FIG. 4 is a block diagram of a coder that forms part of the complex signal generator of FIG. 3.

In FIG. 4, there is shown a block diagram of the coder 202 (shown in FIG. 3) in greater detail. An input data register 210 has a data output and a data input, with the data input receiving the data words from the MUX 200 (shown in FIG. 3). The data output of the input data register 210 and the feedback output of a feedback register 216 are coupled to the address input of a random access memory (RAM) 212 which contains a coder data table 214 which is a look up table for mapping the data words to symbol codes according to the address input. The symbol output of the RAM 212 containing the symbol codes is provided to the map 204 as well as to an input of the feedback register 216.

Because the combination of the data output of the input data register 210 and the feedback output of the feedback register 216 forms the RAM address presented to the RAM 212, the symbol codes that are being generated by the coder 202 may depend on previously generated symbol codes. This dependency of the current symbol code on past symbol codes as well as data words present at the data input of the input data register 210 may be determined in the coder table 214 using well known state machine concepts to implement desired modulation types such as differential coding as well as various error coding schemes.

A selected number of bits from the output of the RAM 212 is provided to the feedback register 216 to implement the RAM-based state machine. The number of address bits taken from the input data register 210 and from the feedback register 216 to form the RAM address is selectable by the user. Alternatively, the feedback register 216 can be disabled, allowing the coder 202 to simply map data words to symbol codes, with no dependencies on previous symbol codes.

The use of the general RAM-based state machine to implement the coder function in the coder 202 creates an unexpected level of versatility in the conversion of data words to symbols. The International Morse Code serves as a simple example of the versatility that may be obtained with the coder 202 according to the present invention. A collection of symbols consisting of various combinations of dots and dashes, the Morse code is a set of symbols for the letters of the alphabet and numbers. This set of symbols can be readily defined using a combination of states created in the coder data table 214. By using a general RAM based state machine architecture, no dedicated or specialized hardware need be implemented in order to create the various Morse code letters and numbers. Instead, the coder data table 214 necessary to implement the Morse Code symbol set may be defined according to utility software routines that may be readily implemented according to known state machine concepts and programming techniques which are stored in the RAM 212.

Figure 5:
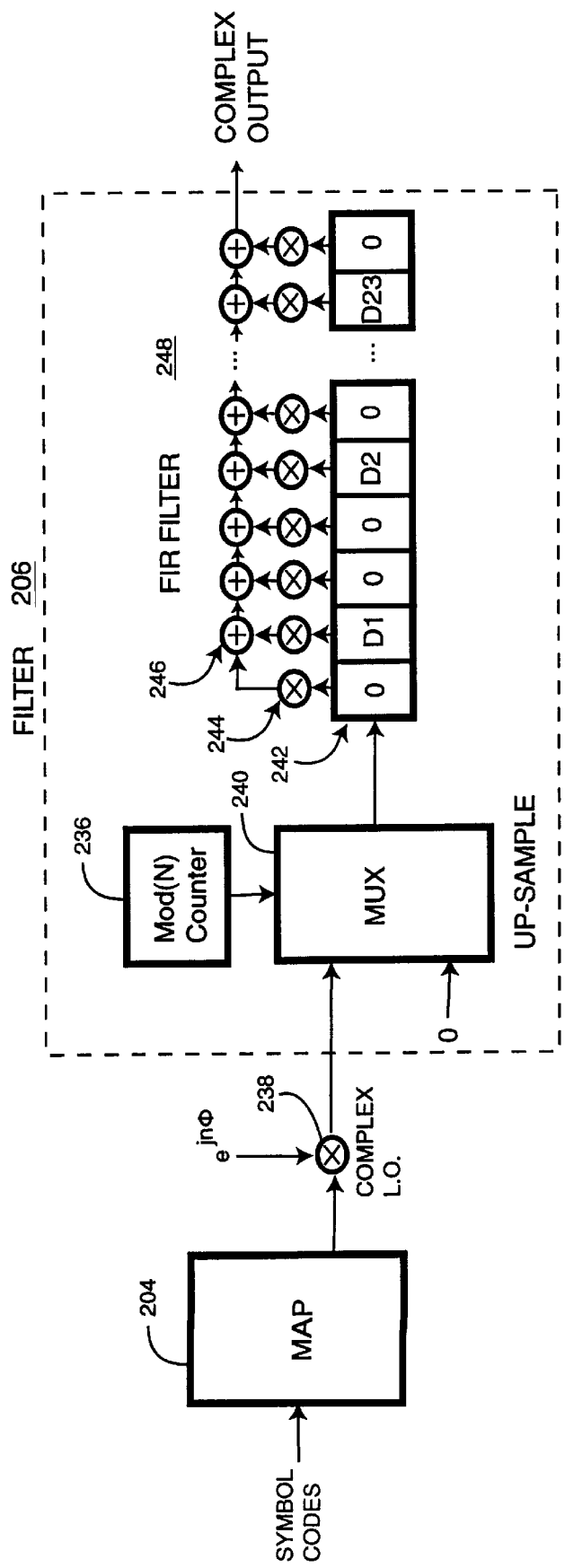
FIG. 5 is a block diagram of a first embodiment of a map and filter which form part of the complex signal generator of FIG. 3.

In FIG. 5, there is shown a more detailed block diagram of the map 204 and filter 206 implemented using a finite impulse response (FIR) filter. As explained above, the map 204 converts symbol codes to symbol values. The symbol values are preferably of high resolution such as 16 bits. In the filter 206, the symbol values, labeled D1, D2, . . . D23 are received by a first input of a MUX 240. A second input of the MUX 240 receives a zero sample. A mod(N) counter 236 is connected to a control input of the MUX 240 to selectively insert N number of zero samples between each symbol value to produce up-sampled symbol values. Up-sampling effectively increases the sample rate and the available Nyquist bandwidth over which the filter response may be specified, thereby increasing the versatility of the filter 206.

Interposed between the map 204 and the filter 206 is a complex local oscillator 238 having an input with an excitation function $e^{jn\phi}$ which provides for optional symbol rotation before the symbol values are filtered by the filter 206. The symbol values and zero samples are provided to an array 242 which is a series of shift registers, each shift register having a tap to provide its stored value to a set of multipliers 244 and a set of accumulators 246. The array 242, set of multipliers 244 and the set of accumulators 246 thus form an FIR filter 248.

The FIR filter 248 may be used to effectively implement the versatile signal generator 100 according to the present invention as a first embodiment with the advantage of employing the FIR filter 248 in a relatively straightforward implementation. The FIR filter 248 may be readily programmed according to known techniques to provide a complex signal with desired frequency characteristics.

FIG. 6 is a block diagram of a second embodiment of the filter 206 in which the map and filter functions have been combined. The filter 206 according to the second embodiment performs the functions of mapping and filtering to produce the complex output as a function of the symbol codes without first converting the symbol codes to symbol values. The map 204 would thus be omitted from the block diagram of FIG. 3 according to the second embodiment. In contrast to the first embodiment shown in FIG. 5, the second embodiment has been implemented in a way that improves flexibility and throughput.

The filter 206 according to the second embodiment does not place the zero input samples into the array 302, thus greatly reducing the amount of computations that must be performed versus the first embodiment. The filter 206 stores the symbol codes, which tend to be low resolution, in the array 300 rather than as high resolution symbol values as is done in the first embodiment. The symbol codes are grouped together as clusters to form packed array symbol codes.

The multiplication operations, rather than being performed at run-time, are pre-computed as a table of products of all possible symbols with each tap, with the table of products stored in a table of tap products 308 in the RAM 212. At run-time, the results can be recalled from the table of products 308 by looking up the product of the symbol codes using the tap number and symbol code to form the address of the result. For example, a 32 ($2^5$) tap filter with 4 ($2^2$) possible symbols would require only a 7 (5+2) bit length of a RAM address 17 in the RAM 212 to store and retrieve all the required multiplier outputs.

Since the typical RAM has more address bits available in its RAM address space, it is possible that more than one tap product may be looked up simultaneously. The array 302 contains the symbol codes D1–D23 which are each 2 bits wide. Each of five adjacent elements of the array 302 are grouped together as clusters. The 10 bit address formed by the symbol codes D1–D5 forms a cluster which is presented to a first input of a MUX 304 as a packed array symbol code. Other clusters appear at other inputs of the MUX 304 which are selected later according to a control input of the MUX 304. In this way, the results can be recalled from the table of products 308 stored in the RAM 212 using the 10 bit address.

Because the results of the other clusters must also be added to the results of the first cluster in order to produce the completed complex output, the output of the RAM 212 as recalled according to the RAM address 17 is provided to a summing node 310 which sums the output of the RAM 212 with the present value stored in an accumulator 312. The value in the accumulator 312 is incremented by the result from the RAM 212 for each cluster.

Various counters are implemented to carry out the process of recalling and adding the results of the various clusters. A mod(C) counter 314 increments once for each cluster up to the total number of clusters. The output of the mod(C) counter 314 is connected to the control input of the MUX 304 which in turn selects the cluster which forms the address at its output. The output of the mod(C) counter 314 also forms part of the address that is provided to the RAM 212 as the tap cluster index. Once the cluster counter wraps around the maximum cluster count c, meaning that the results of all of the clusters have been added in the accumulator 312, the result of the accumulator 312 is clocked out as a completed filter output, the accumulator 312 is then cleared, and a mod(I) counter 316 is incremented. The mod(I) counter 316 contains a 1 bit value indicating whether the value in the accumulator 312 is an I value or a Q value.

After both the I value and the Q value have been clocked out as completed filter outputs to form the complex value, the mod(I) counter 316 wraps around and a mod(N) counter 318 is incremented to indicate another that zero value has been inserted. No zero values are physically inserted into the array 302 however. Rather, for each of the desired number of N zero values, an output filter value is calculated as if zero values were inserted in the array 302 but in a more computationally efficient manner. After the desired number of calculations according to the N zero values have been performed to achieve the up-sampling process, a new symbol value signal is provided to a clock input of the array 302 to shift a new symbol code into the array 302 to start the process over again. A mod(P) counter 320, which operates as a local oscillator (LO) phase counter is also incremented.

The outputs of the mod(I) counter 316 and mod(N) counter 318 may form part of the address provided to the RAM 212 as the RAM address 17. Similarly, the output of the mod(P) counter 320 may be provided to the RAM 212 as a part of the address to include the effects of a complex local oscillator on the complete set of symbol codes stored in the array 302. The effects of the complex local oscillator can be included in the table of tap products 308 by expanding the address space to include all possible rotations of the most recent symbol.

In FIG. 7, there is shown a detailed view of the RAM address 17 formed at the input to the RAM 212. As shown, the RAM address 17 includes the packed array symbol codes with 10 bits, cluster tap index with 5 bits, I/Q with 1 bit, delay with 3 bits, and phase with 3 bits. Practical limitations on the maximum width of the address space of the RAM 212 may create some constraints on which outputs of the mod(I) counter 316, mod(N) counter 318, and mod(P) counter 320 actually are used in the RAM address 17. The choice of which outputs form the RAM address 17 must then be made when the table of tap products 308 is being built and depends on the specific needs of the application.

Figure 8:
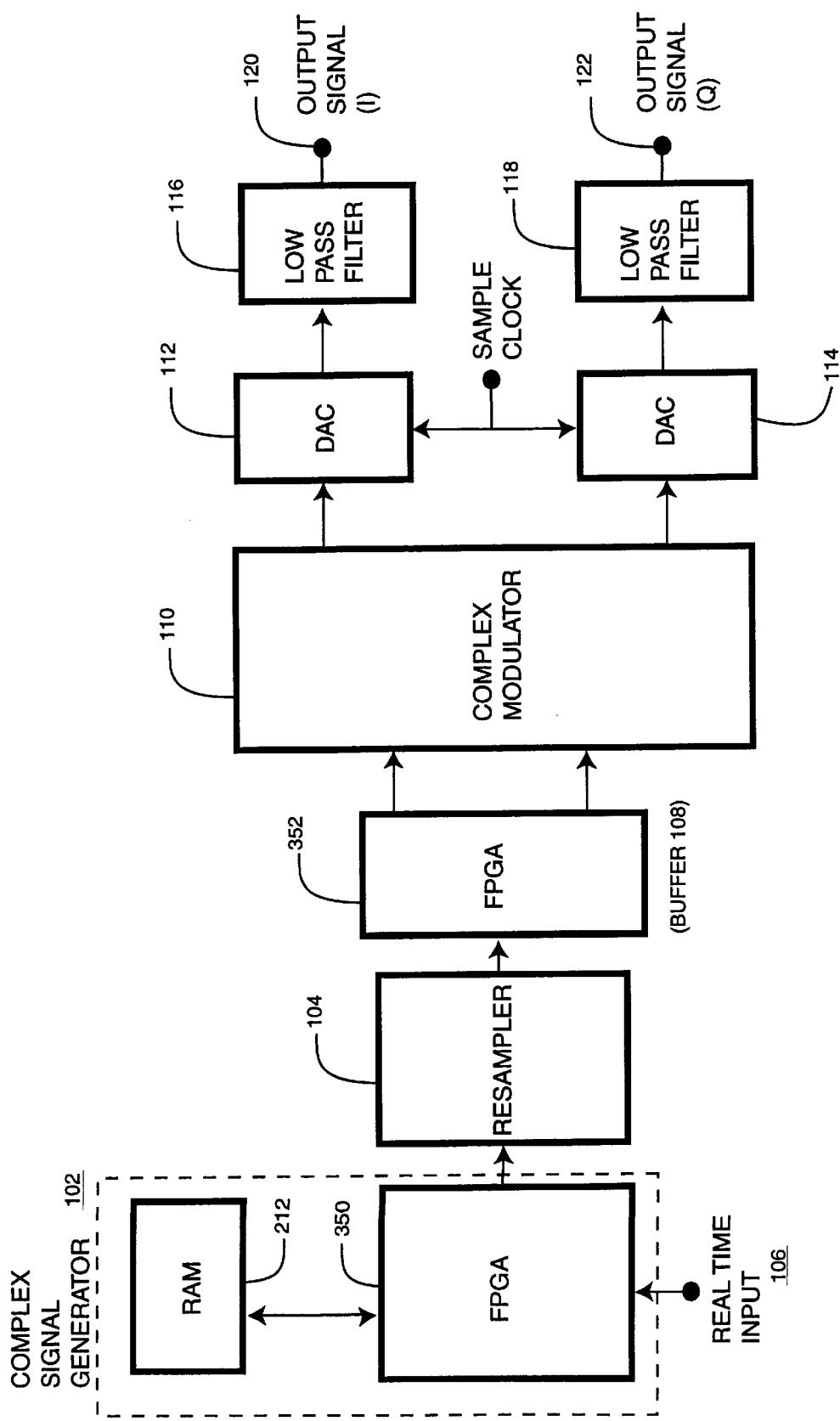
FIG. 8 is a hardware block diagram of the versatile signal generator utilizing the second embodiment of the map and filter according to FIG. 6.

In FIG. 8, there is shown a hardware block diagram of the versatile signal generator 100 according to the preferred embodiment of the present invention. A field programmable gate array (FPGA) 350 is an application specific integrated circuit (ASIC) that receives the real time input 106 (shown in FIG. 2). The RAM 212 may be implemented as a discrete integrated circuit or implemented as part of other integrated circuits. The FPGA 350 is coupled to the RAM 212 to implement the entire complex signal generator 102 including the MUX 200, the coder 202, and the filter 206 (shown in FIG. 6). The RAM 212 contains the table of tap products 308 as well as the coder table 214 and data RAM 132. The re-sampler 104 is implemented as a discrete ASIC. An FPGA 352, also an ASIC, implements the buffer 108 (shown in FIG. 2). The complex modulator 110, the DACs 112 and 114, and the low pass filters 116 and 118 may be constructed using discrete components.

Because the hardware implementation of the versatile signal generator 100 requires no dedicated microprocessor and may be readily reprogrammed and adapted by changing the contents of the RAM 212, the versatile signal generator 100 may be implemented on a relatively small circuit board or module, at low cost, and with low manufacturing complexity. Multiple modules each containing a versatile signal generator 100 may be readily joined together to generate complex spectral simulations, including multipath simulations which require synchronization among various signal sources.

Figure 9:
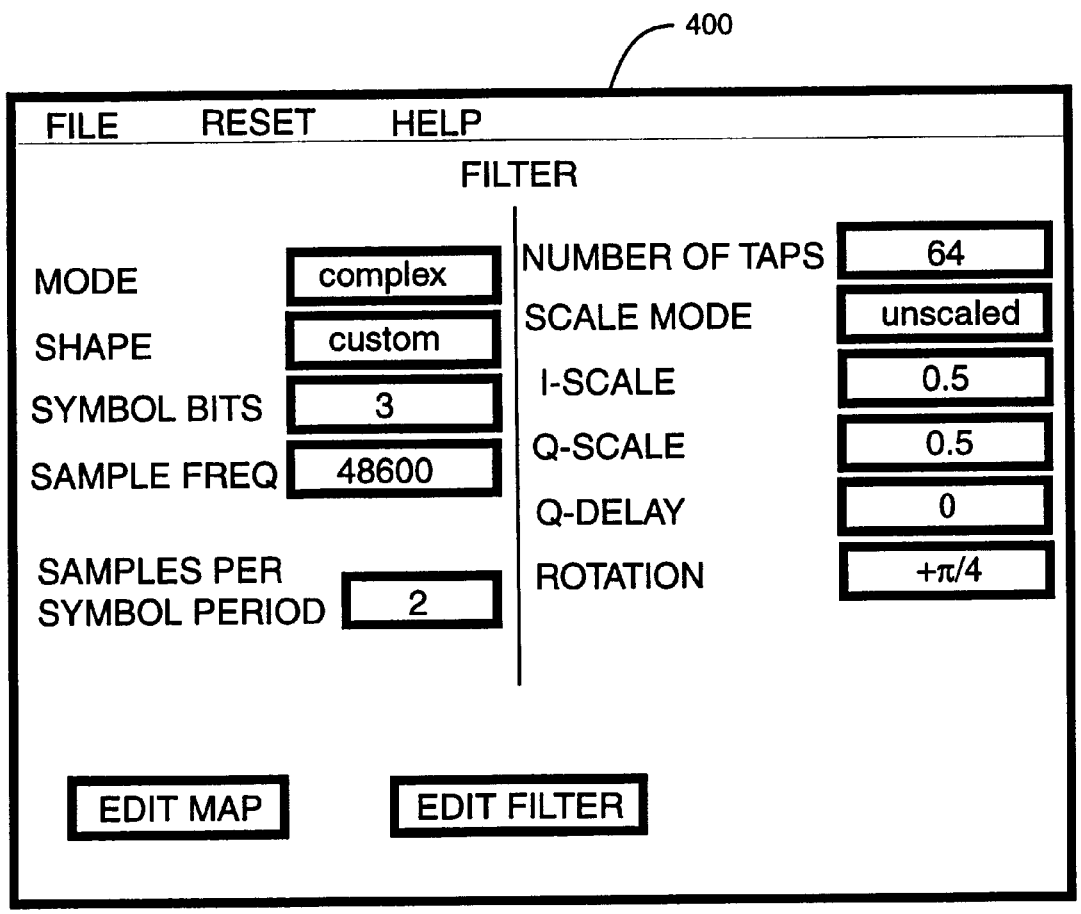
FIG. 9 is an example of a user interface screen for programming the versatile signal generator according to the present invention.

In FIG. 9, there is shown a user interface screen 400 for programming the versatile signal generator 100 according to the present invention. The user interface screen 400 may be generated in high level software using a variety of graphical user interface techniques that are well known in the art for entering and displaying data on personal computers and workstations. The versatile signal generator 100 is highly adaptable and able to generate a wide variety of complex signals including digitally modulated signals as well as traditional function generator signals including sine and square waves. The versatile signal generator 100 is typically interfaced to a personal computer or workstation according to known techniques, allowing for computer control according to selected parameters.

Programming the versatile signal generator 100 is preferably done using a menu hierarchy containing a set of user interface screens that allows the user to control signal parameters in a logical and intuitive manner. As shown, a user interface screen 400 has been selected from the menu hierarchy that allows for programming the parameters of the filter 206. The various parameters may be entered numerically, using pull down menus, or any of variety of data entry techniques known in the art. The various dependencies among the parameters may be handled in the user interface to simplify programming. Alternatively, a set of software library functions may be provided to access the parameters of the versatile signal generator 100 in an automated test system where no user programming is needed.

Using the architecture of the versatile signal generator 100, a wide variety of complex signals involving combinations of frequency modulation (FM), amplitude modulation (AM), quadrature amplitude modulation (QAM), phase modulation (PM) and phase amplitude modulation (PAM) may be generated. The map 204 and filter 206 may be bypassed so that the symbol codes produced by the coder 202 are treated as a direct representation of the symbol values. In this way, the versatile signal generator 100 can operate as a conventional arbitrary waveform generator where the output samples are driven directly with the data codes.

It will be obvious to those having ordinary skill in the art that many changes may be made in the details of the above-described preferred embodiments of the invention without departing from the spirit of the invention in its broader aspects. For example, a variety of different types of application specific integrated circuits (ASICs) may be readily substituted for the FPGA 350 and 352 while maintaining the advantages of minimal component count and ready adaptability. Further integration of RAM and application specific functions may be readily permitted as device capabilities permit. Where no quadrature (Q) output channel is needed, the associated DAC and filter may be readily eliminated while still maintaining the advantages of the flexible architecture. Therefore, the scope of the present invention should be determined by the following claims.

What is claimed is:

1. A complex signal generator comprising:
    (a) a multiplexer having a plurality of inputs and a field counter input wherein one of said inputs coupled to a real time input for receiving input data and said multiplexer selects among said plurality of inputs according to said field counter input to produce data words;
    (b) a coder coupled to said multiplexer to receive said data words wherein said coder produces symbol codes according to said data words;
    (c) a map coupled to receive said symbol codes from said coder wherein said map produces symbol values according to said symbol codes; and
    (d) a filter coupled to said map to receive said symbol values wherein said filter filters said symbol values to produce a complex output having a desired frequency response.

2. A complex signal generator according to claim 1 wherein said multiplexer modulates said complex output according to said real-time input in response to said field counter input.

3. A complex signal generator according to claim 1 wherein one of said plurality of inputs is coupled to a noise input to receive pseudo-random data and another of said plurality of inputs is coupled to a data RAM input to receive a previously stored data sequence.

4. A complex signal generator according to claim 1 wherein said coder comprises:
    (a) an input data register having a data input and a data output wherein said data input is coupled to receive said data words;
    (b) a RAM having an address input and an symbol output wherein said RAM contains a coder table that is addressed by said address input to produce a symbol code at said symbol output and said address input is coupled to said data output; and
    (c) a feedback data register having a feedback input and a feedback output wherein said feedback input is coupled to said symbol output and said feedback output is coupled to said address input to provide dependency of said symbol code on said data words and past symbol codes according to said coder table.

5. A complex signal generator according to claim 1 wherein said filter comprises:
    (a) a MUX having first and second inputs, a control input, and a MUX output, said first input coupled to receive said symbol values and said second input coupled to receive zero samples;
    (b) a mod(N) counter coupled to said control input to selectively insert N number of said zero samples between said symbol values to produce up-sampled said symbol values; and
    (c) an FIR filter coupled to receive said up-sampled symbol values and filter said up-sampled symbol values to produce said complex output with desired frequency characteristics.

6. A complex signal generator comprising:
    a multiplexer having a plurality of inputs and a field counter input wherein one of said inputs coupled to a real time input for receiving input data and said multiplexer selects among said plurality of inputs according to said field counter input to produce data words;
    a coder coupled to said multiplexer to receive said data words wherein said coder produces symbol codes according to said data words;
    a filter coupled to said map to receive said symbol codes wherein said filter produces a complex output having a desired frequency response, wherein said filter comprises;
    (a) a shift register for storing said symbol codes wherein said symbol codes are grouped together as a set of clusters, each of said set of clusters forming packed array symbol codes;
    (b) a MUX coupled to said shift register to receive each of said clusters according to a control input to provide said packed array symbol code at a MUX output;
    (c) a mod(C) counter coupled to said MUX output and said control input wherein said mod(C) counter successively provides for the selection of each cluster by said MUX,
    (d) a RAM having an address input and a RAM output, said address input coupled to said MUX output and said RAM containing a table of tap products, said table of tap products containing the product of the symbol codes, wherein said product of the symbol codes is provided at said RAM output according to said packed array symbol code; and
    (e) an accumulator coupled to said RAM output for summing said product of the symbol codes over said of clusters to form said complex output.

7. A complex signal generator according to claim 6 wherein said complex signal generator is constructed using said RAM and an ASIC coupled to said RAM wherein said ASIC includes said multiplexer, said filter, and said coder.

8. A versatile signal generator, comprising:
    (a) a complex signal generator for generating a complex output wherein said complex signal generator comprises a multiplexer having a plurality of inputs and a field counter input wherein one of said inputs coupled to a real time input for receiving input data and said multiplexer selects among said plurality of inputs according to said field counter input to produce data words, a coder coupled to said multiplexer to receive said data words wherein said coder produces symbol codes according to said data words, a map coupled to receive said symbol codes from said coder wherein said map produces symbol values according to said symbol codes and a filter coupled to said map to receive said symbol values wherein said filter filters said symbol values to produce a complex output having a desired frequency response;

(b) a resampler coupled to said complex signal generator to receive said complex output wherein said resampler produces said complex output at an output sample rate;

(c) a complex modulator for receiving said complex output from said resampler to produce real samples and imaginary samples;

(d) first and second digital to analog converters coupled to said complex modulator for receiving said real samples and said imaginary samples respectively wherein said first and second digital to analog converters produce real and imaginary output signals at said output sample rate; and (e) first and second low pass filters coupled to said first and second digital to analog converters to filter said real and imaginary output signals.

9. A versatile signal generator according to claim 8, said complex signal generator having a real time input for receiving input data wherein said complex signal generator modulates said complex output in real time according to said input data.

10. A versatile signal generator according to claim 9 wherein one of said plurality of inputs is coupled to a noise input to receive pseudo-random data and another of said plurality of inputs is coupled to a data RAM input to receive a previously stored data sequence.

11. A versatile signal generator according to claim 9 wherein said coder comprises:

(a) an input data register having a data input and a data output wherein said data input is coupled to receive said data words;

(b) a RAM having an address input and an symbol output wherein said RAM contains a coder table that is addressed by said address input to produce a symbol code at said symbol output and said address input is coupled to said data output; and (c) a feedback data register having a feedback input and a feedback output wherein said feedback input is coupled to said symbol output and said feedback output is coupled to said address input to provide dependency of said symbol code on said data words and past symbol codes according to said coder table.

12. A versatile signal generator according to claim 9 wherein said filter comprises:

(a) a MUX having first and second inputs, a control input, and a MUX output, said first input coupled to receive said symbol values and said second input coupled to receive zero samples;

(b) a mod(N) counter coupled to said control input to selectively insert N number of said zero samples between said symbol values to produce up-sampled said symbol values; and (c) an FIR filter coupled to receive said up-sampled symbol values and filter said up-sampled symbol values to produce said complex output with desired frequency characteristics.

13. A versatile signal generator comprising:

a complex signal generator for generating a complex output wherein said complex signal generator comprises a multiplexer having a plurality of inputs and a field counter input wherein one of said inputs coupled to a real time input for receiving input data and said multiplexer selects among said plurality of inputs according to said field counter input to produce data words, a coder coupled to said multiplexer to receive said data words wherein said coder produces symbol codes according to said data words, and a filter coupled to said map to receive said symbol values wherein said filter filters said symbol values to produce a complex output having a desired frequency response;

a resampler coupled to said complex signal generator to receive said complex output wherein said resampler produces said complex output at an output sample rate;

a complex modulator for receiving said complex output from said resampler to produce real samples and imaginary samples;

first and second digital to analog converters coupled to said complex modulator for receiving said real samples and said imaginary samples respectively wherein said first and second digital to analog converters produce real and imaginary output signals at said output sample rate; and first and second low pass filters coupled to said first and second digital to analog converters to filter said real and imaginary output signals wherein said filter comprises:

(a) a shift register for storing said symbol codes wherein said symbol codes are grouped together as a set of clusters, each of said set of clusters forming packed array symbol codes;

(b) a MUX coupled to said shift register to receive each of said clusters according to a control input to provide said packed array symbol code at a MUX output;

(c) a mod(C) counter coupled to said MUX output and said control input wherein said mod(C) counter successively provides for the selection of each cluster by said MUX;

(d) a RAM having an address input and a RAM output, said address input coupled to said MUX output and said RAM containing a table of tap products, said table of tap products containing the product of the symbol codes, wherein said product of the symbol codes is provided at said RAM output according to said packed array symbol code; and (e) an accumulator coupled to said RAM output for summing said product of the symbol codes over said of clusters to form said complex output.

14. A versatile signal generator according to claim 13 wherein said complex signal generator is constructed using said RAM and an ASIC coupled to said RAM wherein said ASIC includes said multiplexer, said filter, and said coder.

15. A versatile signal generator according to claim 14 wherein said RAM holds a set of parameters for controlling said versatile signal generator.

16. A versatile signal generator according to claim 15 further comprising means for generating a set of user interface screens that enable a user to enter said parameters.

17. A versatile signal generator according to claim 15 further comprising means for running a set of software library functions for setting said parameters.

* * * * *